(12) United States Patent
Gustafsson et al.

(10) Patent No.: US 9,414,654 B2
(45) Date of Patent: Aug. 16, 2016

(54) COIN STRUCTURE

(71) Applicant: MINT OF FINLAND LTD., Vantaa (FI)

(72) Inventors: Paul Valfrid Gustafsson, Lahela (FI);
Matti Johannes Rastas, Espoo (FI);
Tuomas Mikael Pinomaa, Helsinki (FI)

(73) Assignee: MINT OF FINLAND LTD., Vantaa (FI)

( * ) Notice: Subject to any disclaimer, the term of this patent is extended or adjusted under 35 U.S.C. 154(b) by 181 days.

(21) Appl. No.: 14/436,113

(22) PCT Filed: Oct. 19, 2012

(86) PCT No.: PCT/FI2012/051005
§ 371 (c)(1),
(2) Date: Apr. 16, 2015

(87) PCT Pub. No.: WO2013/057377
PCT Pub. Date: Apr. 25, 2013

(65) Prior Publication Data
US 2015/0282576 A1   Oct. 8, 2015

(30) Foreign Application Priority Data
Oct. 21, 2011   (FI) .................................... 20116043

(51) Int. Cl.
*B32B 3/30* (2006.01)
*A44C 21/00* (2006.01)
(Continued)

(52) U.S. Cl.
CPC . *A44C 21/00* (2013.01); *B32B 3/30* (2013.01); *B32B 15/01* (2013.01); *B32B 15/043* (2013.01); *G07D 5/00* (2013.01); *G07F 1/06* (2013.01); *Y10T 428/12292* (2015.01); *Y10T 428/218* (2015.01)

(58) Field of Classification Search
CPC .......... Y10T 428/21; A44C 21/00; B32B 3/30
USPC .......................................... 428/64.1; 40/27.5
See application file for complete search history.

(56) References Cited

U.S. PATENT DOCUMENTS 3,697,237 A    10/1972  Seiz
8,622,311 B2    1/2014  Hamedani et al.
(Continued)

FOREIGN PATENT DOCUMENTS

DE    102009015579    10/2010
EP    0564667    10/1993
(Continued)

OTHER PUBLICATIONS

International Search Report for PCT/FI2012/051005, Completed by the Finnish Patent Office on Feb. 1, 2013, 6 Pages.
(Continued)

*Primary Examiner* — Alexander Thomas
(74) *Attorney, Agent, or Firm* — Brooks Kushman P.C.

(57) ABSTRACT

Coins and tokens manufactured from metal(s), alloy(s) or metal containing material(s). More specifically, they relate to coin structures which enable a coin to be nondestructively authenticated by an ultrasonic measurement. The core part of coin or token includes 2-16 cavities that are not visible from the exterior of the coin or token. Additionally, the core part or coin or token includes at least one part having a different volume microstructure than the rest of the core part.

15 Claims, 4 Drawing Sheets

(51) Int. Cl.
   *G07D 5/00*   (2006.01)
   *G07F 1/06*   (2006.01)
   *B32B 15/01*  (2006.01)
   *B32B 15/04*  (2006.01)

(56) References Cited

U.S. PATENT DOCUMENTS

2002/0154290 A1   10/2002   Tompkin et al.
2006/0279420 A1   12/2006   Charlier et al.

FOREIGN PATENT DOCUMENTS

| EP | 1384413 | 1/2004 |
| FI | 101360 | 6/1998 |
| JP | 0898709 | 4/1996 |
| WO | 9618173 | 6/1996 |
| WO | 9851180 | 11/1998 |

OTHER PUBLICATIONS

Finnish Search Report for Finnish Application No. FI 20116043, Completed by the Finnish Patent Office on Aug. 14, 2012, 2 Pages.

COIN STRUCTURE

CROSS-REFERENCE TO RELATED APPLICATIONS

This application is the U.S. national phase of PCT Application No. PCT/FI2012/051005 filed on Oct. 19, 2012, which claims priority to FI Patent Application No. 20116043 filed on Oct. 21, 2011, the disclosures of which are incorporated in their entirety by reference herein.

FIELD OF THE INVENTION

The present invention relates to coins and tokens manufactured from metal(s), alloy(s) or metal containing material(s). More specifically, it relates to a coin structure which enables a coin to be non-destructively identified by means of an ultrasonic measurement, in particularly using electromagnetic-acoustic transducers (EMATs).

BACKGROUND OF THE INVENTION

Reliable authentication, identification and validation of a coin are required in the modern society in order to ensure efficient production and circulation of coins as a cash payment instrument. The main aspects of coin identification are rejection of counterfeited and foreign coins, correct coin validation and sorting in circulation.

Bimetallic coins consisting of a ring part and a core part and containing at least two different metals or alloys are widely used in the world as circulation and commemorative coins. For example, the worldwide known one and two euro coins consist of a ring and a core from $CuNi_{25}$ and $CuZn_{20}Ni_5$ alloys. The authentication error rate of such bimetallic coins is low in the coin validating or sorting equipment which measures signals which are dependent on the electromagnetic properties of the coin materials. The problem is that counterfeited coins or foreign coins of comparable dimensions and parameters cannot be reliably identified. In order to increase the coin security, i.e. to improve authentication and validation of both simple one-part coins as well as coins consisting of two parts, it was suggested to provide a centre positioned through-hole in the coin. Examples of such coins are 1 and 5 Norwegian krone coins in addition to 5 Denmark krone coin. Another solution proposes characteristic holes which allow identifying a denomination visually, which is disclosed in WO98/51180.

Documents WO96/18173 and DE102009015579 teach to implement an opening in a bimetallic coin or a coin from a metal-polymer composition for insertion of an electronically identifiable component, like an IC chip or RFID transponder. Although such electronic components possess high specific authentication, the manufacturing of such coins is currently very difficult and expensive. Therefore, such IC or RFID coding is acceptable for circulation coins only under certain circumstances, and cannot be applied to authentication of a large amount of coins.

PURPOSE OF THE INVENTION

The purpose of the present invention is to eliminate existing problems relating to economic authentication of a large amount of coins. The present invention provides a novel coin or token structure for authentication by means of an ultrasonic measurement. Said coin or token structure provides high authentication, identification and validation rate in the coin validation and/or sorting machines equipped with non-destructive ultrasonic measurement units, such as an electromagnetic-acoustic transducer (EMAT), thus reliably preventing a misvalidation or acceptance of counterfeited or foreign coins and tokens. The present coin or token structure should allow an economically worthwhile high volume production.

SUMMARY OF THE INVENTION

The invention relates to a coin or token comprising a core part in the form of a disk comprising an upper end, a lower end and a curved side, the core part comprising at least one layer of metal or a metal alloy, characterized in that the core part further comprises from 2 to 16 cavities that are not visible from the exterior of the coin or token, which cavities extend radially in the horizontal plane towards the longitudinal axis of the coin or token, the volume of each cavity ranging from about 0.5 $mm^3$ to about 2 $mm^3$ for authentication by an ultrasonic measurement.

In other words, said 2 to 16 cavities are externally invisible for an observer. Thus, a cavity may be e.g. buried or completely sealed or embedded inside a coin or token, or it may comprise an opening into the surface of a coin or token, which opening is covered with a metal or a metal alloy layer in order to make said opening invisible in a visual inspection. Here, a longitudinal axis means the central axis or a symmetry axis of a coin or token. The coin or token may be manufactured either from one metal or metal alloy, or it may have a layered structure comprising different metals and/or metal alloys. In addition, the coin or token may comprise one or several parts, prime examples being bi- and trimetallic coins manufactured from several parts.

According to the present invention, from 2 to 16 cavities are manufactured or fabricated in a coin or token in order to provide a high authentication, identification and validation rate in the coin validation and/or sorting machines, i.e. a cavity is used as an authentication, identification or security feature against counterfeited or foreign coins and tokens.

When studying a coin or token by means of a non-destructive ultrasonic measurement, e.g. using an EMAT device, a mechanical wave is guided to said coin or token. As the mechanical wave propagates and meets the cavity, a reflection occurs. Total reflection occurs when the cavity is empty, i.e. when it is filled with air. In the case when the cavity is totally filled with a metal or metal alloy during the minting process, said metal or metal alloy being different from that of the coin or token, the filled cavity causes a tension field into the coin or token. When the propagating mechanical wave meets said totally filled cavity, it is partially reflected. The receiving coil of the measuring device detects the induced voltage caused by possible reflections and the change in the mechanical wave behaviour due to the presence or non-presence of the cavities. Therefore, each coin or token provides a characteristic structure specific voltage signal depending on the cavity numbers and geometry in addition to the geometry and material of the coin or token itself. The structure specific voltage signal enables each coin or token comprising at least one cavity to be authenticated, identified or distinguished from other coins or tokens of the same shape, size and weight, but comprising no cavities. Based on the same measurement principle, also a coin or token comprising cavities being arranged in a certain pattern may be distinguished from a coin or token comprising cavities arranged in a different pattern.

The invention also relates to a coin or token comprising a core part in the form of a disk comprising an upper end, a lower end and a curved side, the core part comprising at least one layer of metal or a metal alloy, and the core part further comprising at least one part comprising a different volume microstructure of material than the rest of said core part for authentication by an ultrasonic measurement. Here, the different volume microstructure of material means that the microstructure of a certain part of the core part is locally changed (meaning that the material physical properties are locally changed), but the microstructure of the rest of the coin or token remains unchanged.

In one embodiment of the present invention, for authentication by an ultrasonic measurement the cavities are arranged in a predetermined pattern on a curved side so that the angle between the central axis of one cavity and the central axis of any other cavity, measured counterclockwise around the longitudinal axis of a coin or token, is 22.5°×n, where integer n is 1, 2, 3, 4, 5, 6, 7, 8, 9, 10, 11, 12, 13, 14, 15, 16. Integer n also describes the cavity position number. According to the above, the angle between the central axis of one cavity and the central axis of another cavity measured counterclockwise around the longitudinal axis (i.e. central axis) of a coin or token is one of the following: 22.5°, 45°, 67.5°, 90°, 112.5°, 135°, 157.5°, 180°, 202.5°, 225°, 247.5°, 270°, 292.5°, 315°, 337.5°. In a case where a coin or token comprise e.g. three cavities, the angle between the central axis of the first cavity and the central axis of the second cavity, measured counterclockwise around the longitudinal axis of the coin or token, may be e.g. 45°, and the angle between the central axis of the first cavity and the central axis of the third cavity may be e.g. 247.5°. The pattern of cavities defined above enables a particularly reliable identification of coins or tokens by means of ultrasonic measurements; e.g. using EMAT.

In one embodiment of the present invention, the coin or token comprises a core part and a ring part in the form of a hollow cylinder comprising metal or a metal alloy, further comprising an outer curved side and an inner curved side, the core part being fixed to the ring part so that the core part and the ring part share the same longitudinal axis and the same central horizontal plane, and that the inner curved side of the ring part and the curved side of the core part are in contact, further comprising from 2 to 16 cavities that are not visible from the exterior of the coin or token, which cavities extend radially in the horizontal plane towards the longitudinal axis of the coin or token, the volume of each cavity ranging from about 0.5 mm$^3$ to about 2 mm$^3$ for authentication by an ultrasonic measurement. The bimetallic coin or token comprising 2 to 16 cavities according to this embodiment may also be identified by means of ultrasonic measurement methods similarly to a monometallic coin or token disclosed earlier.

In another embodiment of the present invention, at least one cavity and at least one other cavity are arranged symmetrically in the same horizontal plane with respect to the longitudinal axis of the coin or token. Therefore, in the case of a symmetrical pattern consisting e.g. of three cavities, the angles between the consequent cavities are 120°. Studies performed by the inventors show that symmetrical arrangement of cavities is desirable, as said arrangement enables a particularly reliable identification of coins or tokens by means of ultrasonic measurements using EMAT.

In one embodiment of the present invention the shape of at least one cavity is one of the following: a cone, a bottle, a wedge, a cylinder.

In one embodiment of the present invention at least one cavity comprises at least one of the following: a slit, a recess, a groove, a pocket.

A cavity may comprise any type of an opening within the structure or on the surface of a coin or token, such as a slit, a recess, a groove, a pocket, a cut, a fracture; however, said cavity does not comprise an opening externally visible to the surface of the coin or token. In addition, a cavity does not comprise a through-hole. Cavities may have different geometries and shapes, e.g. a cone, a bottle, a wedge, a cylinder shape, of different sizes and aspect ratios. However, in order to be reliably authenticated by an ultrasonic measurement, the volume of each cavity shall be from about 0.5 mm$^3$ to about 2 mm$^3$. Cavities may comprise at least one vertical or horizontal slit or cut having a high aspect ratio, i.e. the length of said slit or cut being relatively long compared to the width in the horizontal or to the height in the vertical plane. Typical dimensions of cavities having a conical or cylindrical shape are: the length and the cross-section in the horizontal plane ranging from about 1000 µm to about 3000 µm, preferably from about 2000 µm to about 3000 µm; the cross-section in the vertical plane ranging from about 500 µm to 1000 µm. Cavities may also be in the form of e.g. spherical pockets having a cross-sectional diameter ranging from about 500 µm to about 1000 µm.

In another embodiment of the present invention, at least one cavity is at least partially filled with a metal and/or a metal alloy. After minting, the cavities may be at least partially filled with a metal and/or a metal alloy which may differ from the metal and/or metal alloy the coin or token is made of. A coin or token comprising cavities at least partially filled with different metals or metal alloys has a distinctive vibration mode and thus may be authenticated by means of an ultrasonic measurement from coins or tokens comprising no cavities or cavities filled with other metals or metal alloys.

In another embodiment of the present invention, at least one cavity is at least partially filled with air. When filling the cavities after minting, at least one cavity may on purpose be only partially filled with metal or metal alloy. In addition, at least one cavity may not be filled completely for other reasons, e.g. due to a combination of a relatively low pressing force and the coin design in the area of the cavity. In that case, at least one cavity remains partially filled with the metal or metal alloy and partially with air.

In another embodiment of the present invention, at least one cavity and at least one other cavity are arranged at different heights above or below the central horizontal plane of the coin or token. The configuration of the cavities affects the vibration modes and thus a coin or token comprising at least one cavity located at a certain height above or below the central horizontal plane may be identified from otherwise similar coins or tokens having cavities at a different height. In order to be distinguished from one another by means of ultrasonic measurement methods, the distance between cavities measured inside the coin either in the horizontal or the vertical plane shall be at least about 100 µm.

In another embodiment of the present invention, at least one cavity and at least one other cavity are arranged at different radial distances from the longitudinal axis of the coin or token. The location of the cavities relative to the longitudinal axis also affects the vibration modes. The typical radial distance between a cavity and the longitudinal axis ranges from about 500 µm to about 1000 µm.

In another embodiment of the present invention, at least one cavity extends radially in the horizontal plane towards the longitudinal axis of the coin or token. The exact length of a cavity in the horizontal plane may vary from about 1000 µm to about 3000 µm, preferably from about 2000 µm to about 3000 µm.

In another embodiment of the present invention, at least one cavity comprises an opening into the curved side of the core part, which opening is not visible from the exterior of the coin or token. The cavity according to said embodiment may be manufactured e.g. by laser drilling the curved side of the core part of a coin, so that a cavity comprising predetermined dimensions is formed into a solid surface of the curved side of the core part. Said at least one cavity may be then filled with a metal or a metal alloy or left unfilled with metal.

In the case of a monometallic coin, after all the cavities are manufactured, the curved side is further covered with a metal or metal alloy layer in order to make openings of said cavities externally invisible. The deposition of the metal or metal alloy layer covering the externally visible openings does not require detailed explanation for a skilled person, as many well-known techniques exist and are described in general technical literature. The thickness and composition of a metal or metal alloy layer may vary, as long as said layer fully covers and hides said cavity opening, so that it is impossible for an outside observer to visually detect whether there is one, several or no cavities under the layer. The metal or metal alloy layer may comprise the same metal or metal alloy the core part or the ring part is made of, or it may comprise different metals. In the case of a bimetallic coin, the curved side of the core part is externally invisible after the core part and the ring part are fixed together, as the ring part is assembled and fixed around the curved side of the core part, covering it and hiding any openings from an external visual inspection. In that case, applying a covering layer to the outer curved side of a core part is not necessary.

In another embodiment of the present invention, at least one cavity comprises an opening into the outer curved side or the inner curved side of the ring part of the coin or token, which opening is not visible from the exterior of the coin or token. Said cavity may be also manufactured e.g. by laser drilling and may be then filled with a metal or a metal alloy or left unfilled. After manufacturing, any openings to the outer curved side are covered with a metal or metal alloy layer in order to make said openings externally invisible. Openings to the inner curved side do not need to be covered, as they are not externally visible after the ring part is fixed to the core part in order to form a bimetallic coin.

In another embodiment of the present invention, at least one cavity comprises an opening into the upper end or the lower end of the core part, which opening is not visible from the exterior of the coin or token. As above, the cavity according to said embodiment may be manufactured e.g. by laser drilling the solid upper end or the lower end of the core part of a coin. Said at least one cavity may be then filled with a metal or a metal alloy or left unfilled with metal. In another embodiment of the present invention, at least one cavity comprises an opening into the upper end or the lower end of the ring part of the coin or token. After cavity manufacturing, any openings into the upper end or the lower end of the core part in addition to any openings into the upper end or the lower end of the ring part are covered with a metal or metal alloy layer in order to make said openings externally invisible.

Manufacturing bimetallic coins or tokens comprising cavities with openings into the curved side of the core part or the inner curved side of the ring part is more feasible and cost-efficient compared to coins or tokens comprising cavities having openings e.g. into the upper or lower ends of the core or ring parts. In the former case, no additional metal or metal alloy layer deposition is required to cover the opening from the external visual inspection; in the latter case any externally visible cavity openings on the surface of the coin or token have to be covered and hidden by an additional metal or metal alloy layer.

According to the present invention, the core part comprises from 2 to 16 cavities. Having at least two cavities enables serial coding of the coin or token. However, manufacturing over 16 or 20 cavities in a coin or token is not feasible in practice, as it is a time-consuming and costly procedure which does not bring any major advantages when considering serial coding or identification of a coin or token comprising, say, five or ten cavities.

Each coin or token comprising a characteristic number or a predetermined pattern of cavities may be assigned e.g. a distinctive serial number distinguishing the coin from the rest of the coins manufactured in the same batch, but having a different number or orientation of cavities. Using e.g. 10-bit coding corresponds to 1024 serial numbers of other information. In that case, five cavities are formed symmetrically around the circumference of a coin or token so that the distance between each cavity is equal. Each cavity corresponds to 1 and no cavity corresponds to 0. In practice, to be able to determine where the coding starts, the size (i.e. the length, width or height) of the cavity corresponding to the starting byte has to differ from that of the other cavities.

In another embodiment of the present invention, at least one cavity is formed by at least one of the following methods: embossing, engraving, minting, punching, laser drilling, ion beam milling. The above methods do not require detailed explanation for a skilled person, as they are well known and described in general technical literature.

In another embodiment of the present invention, at least one cavity and at least one other cavity are arranged in a pattern having cavity positions corresponding to the appropriate coin or token denomination. In said embodiment, a certain arrangement, i.e. position of at least two cavities, is assigned to a certain coin or token denomination. Thus, two cavities of the same size located e.g. at cylindrical coordinates (7 mm, 0°, z), (7 mm, 180°, z), where 7 mm is the distance between the cavity and the longitudinal axis and the variable z is the height from the central horizontal plane to the central horizontal axis of the cavity, may be assigned to indicate a one euro coin. Similarly, six cavities located e.g. at cylindrical coordinates (9 mm, 0°, z), (9 mm, 60°, z), (9 mm, 120°, z), (9 mm, 180°, z), (9 mm, 240°, z) and (9 mm, 300°, z) may be assigned to indicate a two euro coin.

In another embodiment of the present invention, the material microstructures are selectively adjusted by heat treatment of the ring part and the core part for authentication by an ultrasonic measurement. In said embodiment, a bimetallic coin or token, comprising a ring part and a core part, is manufactured from two different metals having different recrystallation temperatures, $T_1$ for the edge part and $T_2$ for the centre part. After a regular manufacturing process, the coin or token is heat treated at a temperature which is between said two recrystallation temperatures. In the treatment, the metal having a lower recrystallation temperature recrystallizes, while the metal having a higher recrystallation temperature does not. After the treatment, the coin or token comprises both recrystallized metal and non-recrystallized metal, which provides said coin or token a characteristic vibration mode depending on the metals used when minting the coin and the temperature of the heat treatment. Because of the distinctive vibration modes, said coin or token also produces a distinctive voltage signal and thus may be identified by means of non-destructive ultrasonic measurement methods.

Typically, the metals are chosen so that the metal of the ring part has a higher recrystallation temperature than the core part. Therefore, during the heat treatment, the metal of the ring part does not recrystallize and thus remains harder than the core part. A harder edge part is desirable as it protects the softer core part from wear and mechanical damages.

In one embodiment of the invention, the microstructure of at least one part of the coin or token is changed locally e.g. by laser heating. Applying said technique locally changes the microstructure and certain material properties, such as hardness or rigidity, of the material being heated by the laser beam, leaving the microstructure of the rest of the coin or token unchanged. A coin or token comprising at least one part having a locally changed volume microstructure of material responds to ultrasonic measurements differently when compared to a similar coin or token without local microstructure changes, thus being distinguishable. The dimensions of said part having a locally changed microstructure may vary; however, the typical dimensions required for successful detection using ultrasonic devices such as EMAT are: a length or width from about 1 mm to 10 mm, a depth from about 10 μm to 500 μm. In the case where the part has a circular cross-section, the diameter of said cross-section preferably ranges from about 1 mm to about 10 mm.

BRIEF DESCRIPTION OF THE FIGURES

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1A:
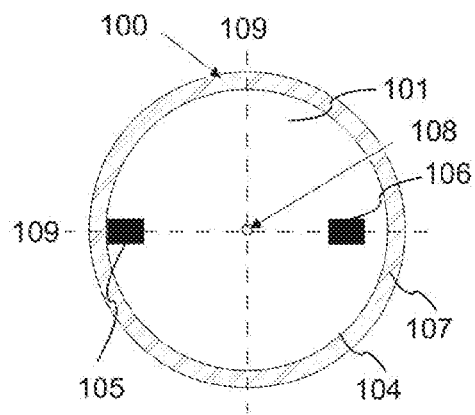
FIG. 1a displays a cross-section along the central horizontal plane and FIG. 1aa displays a cross-section along the central vertical plane of a monometallic coin or token comprising two cavities.
Figure 1A:
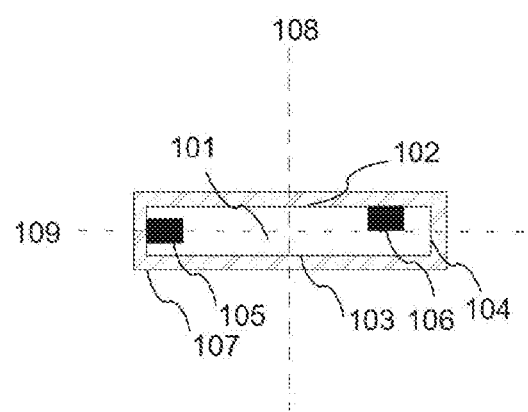

Reference will now be made in detail to the embodiments of the present invention, examples of which are illustrated in the accompanying drawings.

FIG. 1 illustrates examples of coin or token structures. FIG. 1a shows a cross-section along the central horizontal plane and FIG. 1aa shows a cross-section along the central vertical plane of a monometallic coin or token (100). Said monometallic coin or token comprises a core part (101) in the form of a disk comprising an upper end (102), a lower end (103) and a curved side (104), and two cavities, which are not visible from the exterior of the coin or token. Further, the first cavity (105) comprises an opening into the curved side (104) of the core part (101) and the second cavity (106) comprises an opening into the upper end (102) of the core part (101). FIG. 1a also shows a metal layer (107) deposited on the surface of said coin or token (100) after cavity fabrication in order to cover cavity openings from a visual inspection. For clarity reasons, FIG. 1a further shows the longitudinal axis (108) and the central horizontal plane (109) of the coin or token (100).

Figure 1B:
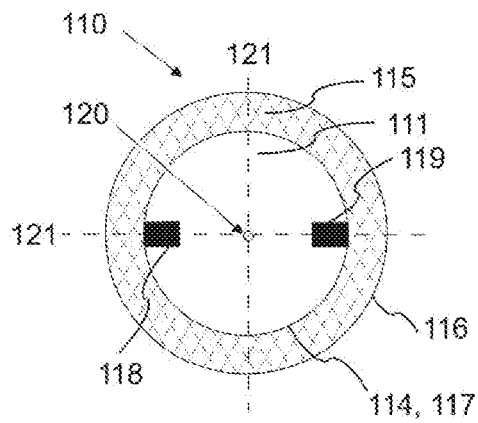
FIG. 1b displays a cross-section along the central horizontal plane and FIG. 1bb displays a cross-section along the central vertical plane of a bimetallic coin or token comprising two cavities.
Figure 1B:
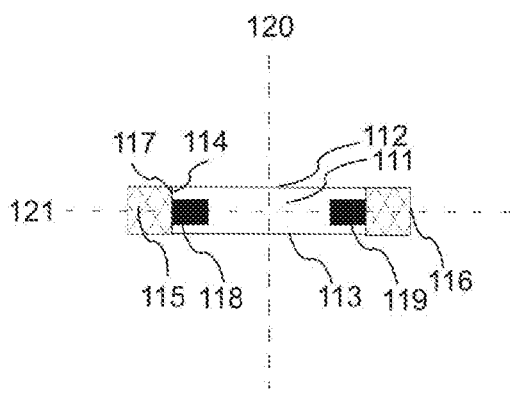

FIG. 1b shows a cross-section along the central horizontal plane and FIG. 1bb shows a cross-section along the central vertical plane (120) of a bimetallic coin or token (110). Said bimetallic coin or token comprises a core part (111) in the form of a disk comprising an upper end (112), a lower end (113) and a curved side (114), a ring part (115) in the form of a hollow cylinder comprising an outer curved side (116) and an inner curved side (117), the core part being fixed to the ring part so that the core part and the ring part share the same longitudinal axis (120) and the same central horizontal plane (121), and that the inner curved side (117) of the ring part and the curved side (114) of the core part are in contact. Said bimetallic coin or token further comprises two cavities (118, 119) that are not visible from the exterior of the coin or token (110). Said cavities further comprise openings into the curved side (114) of the core part (111). The cavities described above may be manufactured into the solid core part of the coin or token e.g. by embossing, engraving, minting, punching, laser drilling, ion beam milling or similar methods well known in the art. In the case of a bimetallic coin, the cavities are formed in the core part before the core part and the ring part are fixed together, i.e. assembled, to form a solid bimetallic coin. In that case, the cavity openings are not externally visible for an outside observer as they are hidden inside the bimetallic coin.

Due to the structure and geometry of the coins or tokens, each coin or token has a characteristic vibration mode depending on the total number of cavities (105, 106, 118, 119) and their orientation within the coin or token. Therefore, each coin or token provides a characteristic structure specific voltage signal depending on the vibration mode. Said structure specific voltage signal may be detected by means of an ultrasonic measurement, e.g. using an EMAT device. The structure specific voltage signal enables each coin to be identified or to be distinguished from other coins or tokens of the same shape, size, weight etc. In the case when the cavity is totally filled with metal during the minting process, the filled cavity causes a tension field in the coin or token. Due to said tension field, a coin or token having at least one filled cavity has a distinctive vibration mode and thus a distinctive voltage signal. Therefore, also coins or tokens having filled cavities may be identified by means of ultrasonic measurement methods.

The size and shape of the cavities may vary; the typical dimensions of cavities having a conical or cylindrical shape are: the length in the horizontal plane ranging from about 1000 μm to 3000 μm, preferably from about 2000 μm to about 3000 μm; the cross-section in the vertical plane ranging from about 500 μm to about 1000 μm. The cavities may also be in the form of e.g. cubical of spherical pockets having a cross-sectional diameter ranging from about 500 μm to about 1000 μm.

Figure 2:
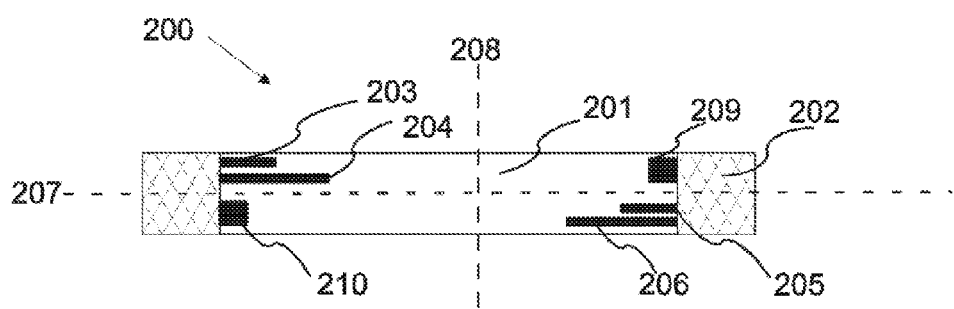
FIG. 2 displays a cross-section along the central vertical plane of a bimetallic coin or token comprising cavities arranged at different heights above and below the central horizontal plane of the coin, said cavities being in the form of slits having an opening into the curved side of the core part and extending radially in the horizontal plane towards the longitudinal axis of the coin, and pockets, also having an opening into the curved side of the core part.

FIG. 2 displays a cross-section along the central vertical plane of a bimetallic coin or token (200) comprising a core part (201) and a ring part (202), further comprising cavities (203, 204, 205, 206, 209, 210) arranged at different heights above (203, 204, 209) and below (205, 206, 210) the central horizontal plane (207) of the coin (200), said cavities being in the form of slits (203, 204, 205, 206) extending radially in the horizontal plane towards the longitudinal axis (208) of the coin or token, and in the form of pockets (209, 210). The dimensions of the slits and pockets may vary. The typical cross-sectional diameter of a pocket ranges from about 500 μm to about 1000 μm; the typical dimensions of a slit having a conical or cylindrical shape are: the length and the cross-section in the horizontal plane ranging from about 1000 μm to about 3000 μm, preferably from about 2000 μm to about 3000 μm; the cross-section in the vertical plane ranging from about 500 μm to about 1000 μm. In this embodiment of the invention, the cavity openings are not externally visible for an outside observer as they are hidden inside the bimetallic coin.

Figure 3A:
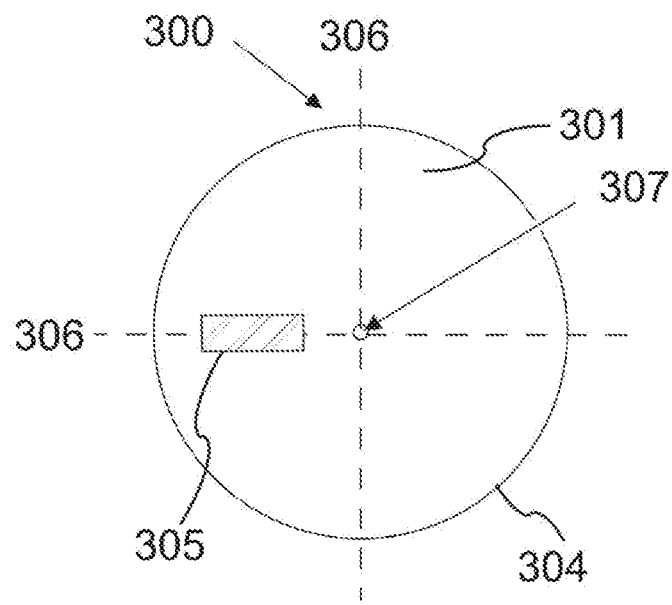
FIG. 3a displays a cross-section along the central horizontal plane of a monometallic coin or token comprising a core part further comprising at least one part comprising a different volume microstructure of material than the rest of said core part.
Figure 3B:
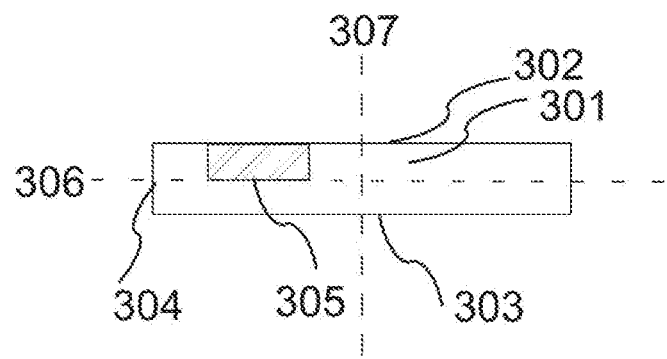
FIG. 3b displays a cross-section along the central vertical plane of a monometallic coin or token comprising a core part further comprising at least one part comprising a different volume microstructure of material than the rest of said core part.

FIGS. 3a and 3b display a cross-section along the central horizontal plane and a cross-section along the central vertical plane, respectively, of a monometallic coin or token (300) comprising a core part (301) in the form of a disk comprising an upper end (302), a lower end (303) and a curved side (304), and one part (305) comprising a different volume microstructure of material than the rest of the core part (301). For clarity reasons, FIGS. 3a and 3b further show the longitudinal axis (307) and the central horizontal plane (306) of the coin or token (300). The dimensions and geometry of the part (305) comprising a locally changed volume microstructure of material may vary; the shape of the part may be cylindrical, cubical, cuboid, pyramidal, cone-shaped etc. Typical dimensions required for successful identification using ultrasonic devices such as EMAT are: depth of the part (305) ranging from about 10 μm to about 500 μm and diameter of the cross-section ranging from about 1 mm to about 10 mm.

Figure 4:
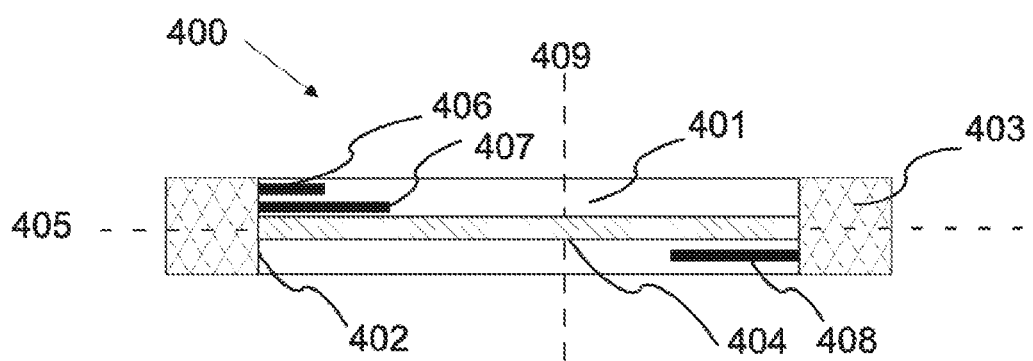
FIG. 4 displays a cross-section along the central vertical plane of a bimetallic coin or token comprising a core from cladded metals or metal alloys and at least one cavity.

FIG. 4 displays a cross-section along the central vertical plane of a bimetallic coin or token (400) comprising a core (404) from a cladded metal or metal alloy and from 2 to 16 cavities. Said core may comprise e.g. a nickel layer. Two euro coins are prime examples of coins comprising a nickel layer in their core part as a security feature. FIG. 4 displays a cross-section along the central vertical plane of a bimetallic coin or token (400) comprising a ring part (403) and a core part (401) in the form of a disk comprising a curved side (402) and a nickel layer (404) located in the central horizontal plane (405) of said coin or token (400), and further comprising three cavities (406, 407, 408), each having an opening to the curved side (402) of the core part (401). The cavities are arranged at different heights above (406, 407) and below (408) the nickel layer (404), said cavities being in the form of slits extending radially in the horizontal plane towards the longitudinal axis (409) of the coin or token. The dimensions of the cavities may vary; a cavity having a conical or cylindrical shape typically has a length in the radial direction ranging from about 1000 μm to about 3000 μm, preferably from about 1000 μm to about 3000 μm, most preferably from 2000 μm to about 3000 μm. The cross-sectional diameter of a cavity in the horizontal plane ranges from about 1000 μm to about 3000 μm; the cross-sectional diameter in the vertical plane ranges from about 500 μm to about 1000 μm. Typically, the separation between the surface of a nickel layer and a cavity, i.e. the vertical distance between them, ranges between about 300 μm and about 500 μm.

It is important to note that, as is clear for a person skilled in the art, the invention is not limited to the examples described above. The actual embodiments of the present invention can freely vary within the scope of the claims.

The invention claimed is:

1. A coin or token comprising a core part in the form of a disk comprising an upper end, a lower end and a curved side, the core part comprising at least one layer of metal or metal alloy, wherein the core part further comprises from 2 to 16 cavities that are not visible from the exterior of the coin or token, which cavities extend radially in the horizontal plane towards the longitudinal axis of the coin or token, the volume of each cavity ranging from about 0.5 mm$^3$ to about 2 mm$^3$ for authentication by an ultrasonic measurement.

2. The coin or token according to claim 1, wherein for authentication by an ultrasonic measurement, the cavities are arranged in a predetermined pattern on a curved side so that the angle between the central axis of one cavity and the central axis of any other cavity, measured counterclockwise around the longitudinal axis of the coin or token, is 22.5°×n, where integer n is 1, 2, 3, 4, 5, 6, 7, 8, 9, 10, 11, 12, 13, 14, 15, or 16.

3. The coin or token according to claim 2, wherein the material microstructures of the ring part and the core part are selectively adjusted by heat treatment for authentication by an ultrasonic measurement.

4. The coin or token according to claim 1, wherein the coin or token further comprises a ring part in the form of a hollow cylinder comprising an outer curved side and an inner curved side, the core part being fixed to the ring part so that the core part and the ring part share the same longitudinal axis and the same central horizontal plane, and that the inner curved side of the ring part and the curved side of the core part are in contact.

5. The coin or token according to claim 1, wherein the cavities are arranged symmetrically in the same horizontal plane around the longitudinal axis of the coin or token.

6. The coin or token according to claim 1, wherein the shape of at least one cavity is one of the following: a cone, a bottle, a wedge, a cylinder.

7. The coin or token according to claim 1, wherein at least one cavity comprises at least one of the following: a slit, a recess, a groove, a pocket.

8. The coin or token according to claim 1, wherein at least one cavity is at least partially filled with at least one metal and/or metal alloy.

9. The coin or token according to claim 1, wherein at least one cavity is at least partially filled with air.

10. The coin or token according to claim 1, wherein at least one cavity and at least one other cavity are arranged at different heights above and/or below the central horizontal plane of the coin or token.

11. The coin or token according to claim 1, wherein the at least one cavity and at least one other cavity are arranged at different radial distances from the longitudinal axis of the coin or token.

12. The coin or token according to claim 1, wherein at least one cavity comprises an opening into the curved side of the core part, which opening is not visible from the exterior of the coin or token.

13. The coin or token according to claim 1, wherein at least one cavity comprises an opening into the upper end or the lower end of the core part, which opening is not visible from the exterior of the coin or token.

14. The coin or token according to claim 1, wherein at least one cavity is formed by at least one of the following methods: embossing, engraving, minting, punching, laser drilling, ion beam milling.

15. The coin or token according to claim 1, wherein the at least one cavity and at least one other cavity are arranged in a pattern having cavity positions corresponding to the appropriate coin or token denomination.

* * * * *